United States Patent
Suryanarayana et al.

(10) Patent No.: US 10,971,114 B2
(45) Date of Patent: Apr. 6, 2021

(54) DYNAMIC RESOLUTION SCALING

(71) Applicant: Dell Products L.P., Round Rock, TX (US)

(72) Inventors: Shekar Babu Suryanarayana, Bangalore (IN); Sumanth Vidyadhara, Bangalore (IN); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 16/267,794

(22) Filed: Feb. 5, 2019

(65) Prior Publication Data
US 2020/0251074 A1 Aug. 6, 2020

(51) Int. Cl.
G09G 5/373 (2006.01)
G06F 3/0484 (2013.01)

(52) U.S. Cl.
CPC ......... *G09G 5/373* (2013.01); *G06F 3/04845* (2013.01); *G09G 2340/0407* (2013.01); *G09G 2340/0442* (2013.01); *G09G 2340/0464* (2013.01); *G09G 2354/00* (2013.01)

(58) Field of Classification Search
CPC ........... G09G 5/373; G09G 2340/0407; G09G 2340/0464; G09G 2354/00; G09G 2340/0442; G06F 3/04845
See application file for complete search history.

(56) References Cited

U.S. PATENT DOCUMENTS

| 6,178,503 | B1 * | 1/2001 | Madden | G06F 1/24 710/8 |
| 6,262,733 | B1 * | 7/2001 | Bogdan | G06F 3/0481 715/846 |
| 6,344,856 | B1 * | 2/2002 | Lum | G09G 5/393 345/538 |
| 2003/0080977 | A1 * | 5/2003 | Scott | G06T 3/4084 345/629 |
| 2004/0268135 | A1 * | 12/2004 | Zimmer | H04L 9/0825 713/189 |
| 2005/0017978 | A1 * | 1/2005 | Hatori | G06F 3/04845 345/501 |
| 2006/0125955 | A1 * | 6/2006 | Yang | H04N 7/0135 348/441 |
| 2009/0109244 | A1 * | 4/2009 | Conner | G06F 9/451 345/660 |
| 2009/0147297 | A1 * | 6/2009 | Stevenson | G06T 19/00 358/1.15 |
| 2012/0017072 | A1 * | 1/2012 | Gillespie | G06F 3/14 713/2 |
| 2014/0132612 | A1 * | 5/2014 | Schulze | G09G 5/363 345/505 |
| 2017/0186136 | A1 * | 6/2017 | Khorasani | G06T 15/005 |

* cited by examiner

*Primary Examiner* — Jitesh Patel
(74) *Attorney, Agent, or Firm* — Norton Rose Fulbright US LLP

(57) ABSTRACT

Upon detection of a change in resolution from a first resolution to a second resolution, one or more user interface elements may be dynamically scaled based, at least in part, on the detected change in resolution. The user interface elements may be dynamically scaled in such a way as to maintain an aspect ratio of each of the user interface elements while adjusting a resolution of each of the user interface elements to the second resolution. After the user interface elements are dynamically scaled, a user interface, at the second resolution, may be presented on a display of an information handling system.

20 Claims, 10 Drawing Sheets

DYNAMIC RESOLUTION SCALING

FIELD OF THE DISCLOSURE

The instant disclosure relates to graphical user interface scaling. More specifically, portions of this disclosure relate to dynamic resolution scaling of a graphical user interface of an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a display for visually presenting information to a user. For example, an information handling system may display a graphical user interface to allow a user to view, edit, and generate information. Visual information may be stored as graphics files that define how the information is presented in the form of pixel matrices or bitmaps. A graphical user interface of an information handling system may simultaneously display a variety of fonts, icons, bitmaps, widgets, windows, images, and other graphical user interface elements generated based on one or more graphics files.

Information handling system displays may have native resolutions and aspect ratios, which may be hardware defined, but may also be configurable to operate at resolutions and aspect ratios that differ from the native resolutions and aspect ratios. For example, an information handling system may be configured to display a graphical user interface at a 16:9 aspect ratio, a 5:4 aspect ratio, a 4:3 aspect ratio, a 3:2 aspect ratio, or another aspect ratio. Information handling systems may further display graphical user interfaces at various resolutions having different aspect ratios. For example, an information handling system may generate a graphical user interface for display at a resolution having an aspect ratio of 16:9, such as a resolution of 1280 by 720, 1024 by 576, or 1920 by 1080, at a resolution with a 4:3 aspect ratio, such as 640 by 480 or 1920 by 1440, or at another resolution and/or aspect ratio. A change in a resolution at which a graphical user interface is displayed may result in stretching, compression, zooming in on, or zooming out on a user interface or elements of a user interface, which may cause information displayed by the user interface to be obscured or lost.

Shortcomings mentioned here are only representative and are included simply to highlight that a need exists for improved information handling systems, particularly for dynamic resolution scaling. Embodiments described herein address certain shortcomings but not necessarily each and every one described here or known in the art. Furthermore, embodiments described herein may present other benefits than, and be used in other applications than, those of the shortcomings described above.

SUMMARY

Upon detecting a change in a resolution for a display, an information handling system may dynamically scale a resolution of one or more graphical user interface elements to adjust the resolution of the graphical user interface based on the detected change in resolution while preventing scaled user interface elements from obscuring information that was displayed before the change in resolution. User interface elements may be scaled to a new resolution without obscuring previously displayed information by maintaining an aspect ratio of each user interface element while adjusting a resolution of each element. This may be accomplished by generating an aspect ratio pixel matrix detailing the aspect ratios of each user interface element at the first resolution. The aspect ratio pixel matrix may then be used in generating a pixel matrix template at the new resolution for each of the user interface elements. Bits of pixel matrices for each of the user interface elements at the old resolution may then be copied to the pixel matrix templates for each of the user interface elements at the new resolution, thereby scaling the resolution of each user interface element while maintaining an aspect ratio of each user interface element. The combined pixel matrices of the user interface elements at the new resolution may form a graphical user interface at the new resolution.

An information handling system may automatically detect and dynamically adjust for changes in resolution. A dynamic resolution scaling method may be initiated after detecting a change in resolution for a display of an information handling system from a first resolution to a second resolution. A change in resolution may be detected when a user manually adjusts a resolution at which a graphical user interface is presented on a display of the information handling system. Alternative or additionally, a change in resolution may be detected when a native display resolution different from a default resolution of an information handling system is detected. For example, a basic input/output system (BIOS), a unified extensible firmware interface (UEFI), and/or an operating system (OS) may be configured to operate at a default resolution with graphical user interface elements stored in a graphics library at the default resolution. The information handling system may include displays of varying native resolutions that may differ from the default resolution. When an information handling system having a display with a native resolution that differs from a default resolution of a BIOS, UEFI, and/or OS of the information handling system, is activated, a change in resolution from a first resolution, the default resolution of the BIOS, UEFI, and/or OS, to a second resolution, the native resolution of the display of the information handling system may be performed to display the BIOS, UEFI, and/or OS on the second information handling system.

When a change in a resolution is detected, one or more elements of the graphical user interface may be scaled based, at least in part, on the second resolution, while preventing the scaled elements from obscuring information displayed by the graphical user interface at a first resolution. For example, the scaling may be controlled to prevent crossovers, missed user interface elements, improper alignments and distortions of user interface elements, and other losses of information displayed by a graphical user interface. Scaling a user interface element may include maintaining an aspect ratio of the user interface element while updating a resolution of the element. Multiple user interface elements may be scaled while maintaining an aspect ratio of each of the user interface elements. Maintaining an aspect ratio of each user interface element when scaling the user interface element to the second resolution, may allow information displayed by the graphical user interface on the display of the information handling system at the first resolution to be retained at the second resolution. For example, retaining an aspect ratio of each user interface element while scaling for resolution can reduce or prevent user interface elements from overlapping or obscuring one another due to the change in resolution. The positioning of user interface elements can also be adjusted during scaling to prevent overlap of user interface elements.

User interface elements may include a variety of items displayed on a graphical user interface such as fonts, bitmaps, windows, widgets, images, icons, and other user interface elements. To scale a user interface element without obscuring information displayed by the user interface at a first resolution, an aspect ratio pixel matrix for the graphical user interface may be generated. For example, the aspect ratio pixel matrix for the graphical user interface may include an aspect ratio for each element of the user interface. The aspect ratio pixel matrix may be used to generate a pixel matrix at the second resolution for each element of the graphical user interface while preserving an aspect ratio for each of the elements of the graphical user interface. The pixel matrices for each of the user interface elements at the second resolution may be combined to form a graphical user interface pixel matrix at the second resolution.

Scaling the user interface element may include performing a bit block transfer (BLT) on the user interface element. A bit BLT may include copying data for each pixel of a pixel matrix for the user interface element at a first resolution to a pixel matrix for the user interface element at the second resolution. For example, if upscaling from a lower first resolution to a higher second resolution, a pixel from the first pixel matrix may be mapped to several pixels of the second pixel matrix. If downscaling, several pixels from the first pixel matrix may be mapped to a single pixel of the second pixel matrix. The pixel matrix for the user interface element at the second resolution may be generated based on an aspect ratio pixel matrix, as described herein. The aspect ratio of the first pixel matrix may be identical to the aspect ratio of the second pixel matrix.

After each user interface element has been scaled, the graphical user interface may be displayed on a display of the information handling system. Because the intelligent scaling prevents the scaled elements from obscuring information displayed at the first resolution, the user interface may display more information to a user after adjusting a resolution than if simple zooming or stretching was performed. Furthermore, the method may be performed while an information handling system is in a pre-boot stage, allowing a graphical user interface to be dynamically scaled even before an OS has booted. For example, during a pre-boot mode, a BIOS/UEFI of an information handling system may be initializing hardware, preparing to boot an OS of the information handling system, and/or booting the OS of the information handling system.

An information handling system may include a display and a processor for performing the steps described herein. The steps described herein may also be included in a non-transitory computer readable medium of a computer program product.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
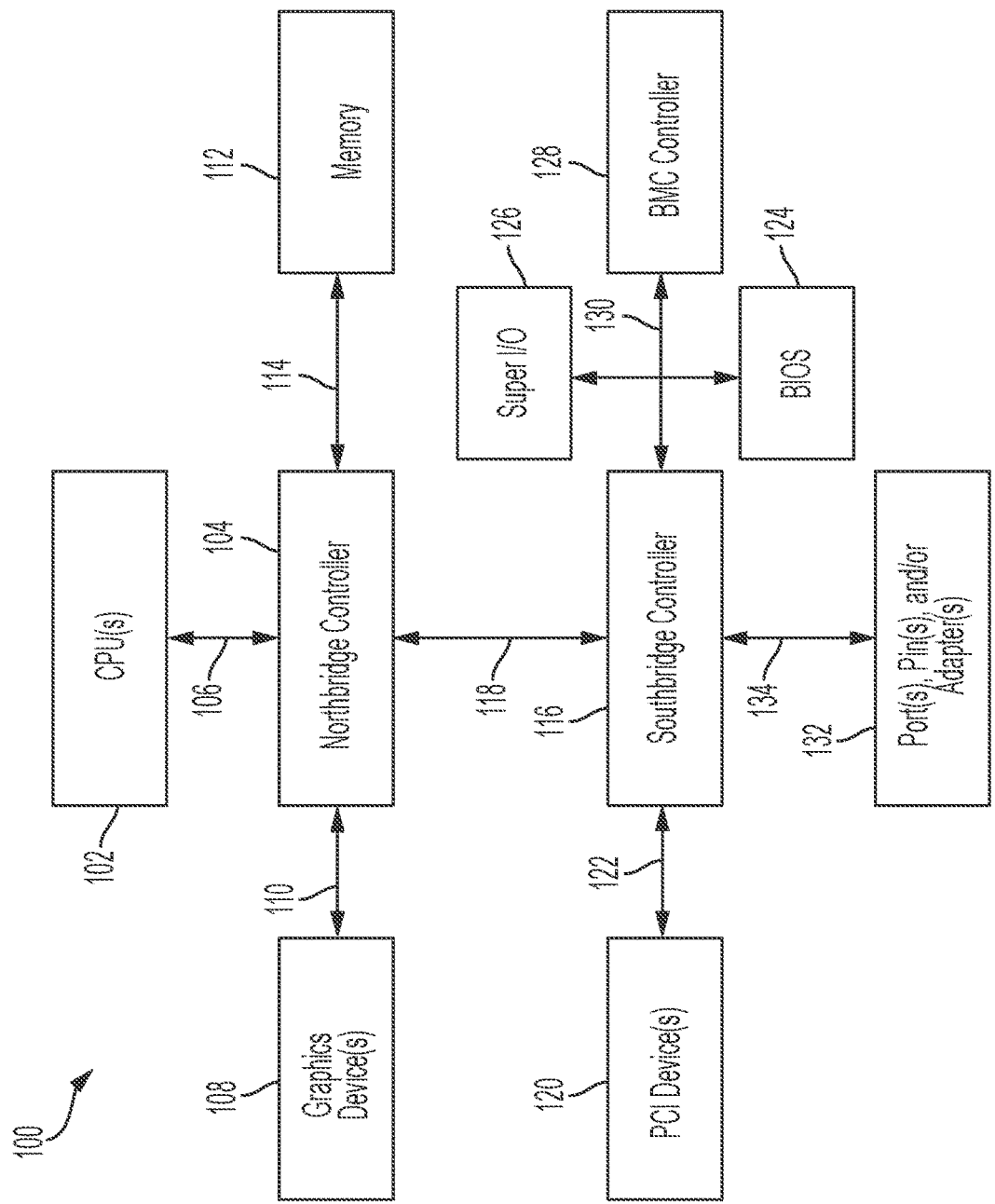
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory having program instructions stored thereon. The instructions stored on the BIOS may be usable CPU(s) 102 to initialize and test other hardware components and/or to load an Operating System (OS) onto IHS 100, for example during a pre-boot stage. As such, BIOS 124 may include a firmware interface that allows CPU(s) 102 to load and execute certain firmware, as described in more detail below. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
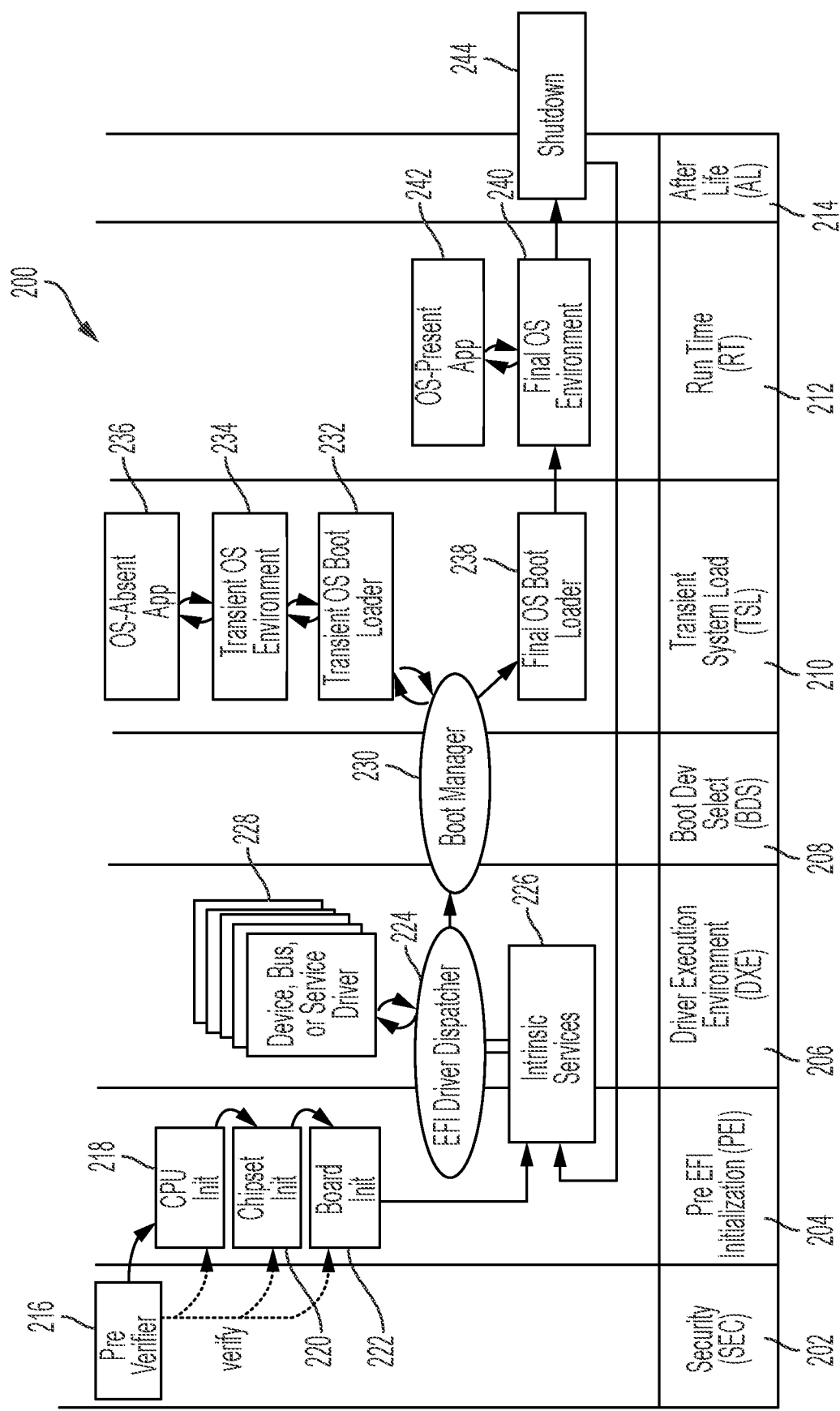
FIG. 2 is a process diagram of an example booting process according to some embodiments of the disclosure.

When an information handling system is powered up or restarted, the information handling system may enter a pre-boot stage where a BIOS/UEFI may initialize and configure hardware and firmware, prepare the information handling system for booting of the operating system, and boot the operating system. The pre-boot stage may begin when the information handling system is powered on and may finish when the information handling system has completed booting of an Operating System. An example process diagram 200 of operation of an information handling system, including a pre-boot stage, is shown in FIG. 2. After an IHS is powered on, the IHS may enter a security phase 202 of the pre-boot stage where the BIOS/UEFI may perform a pre-verify operation 216 to examine the security certificate and verify that the device is ready for secure operation. After the security phase 202, the IHS may enter a pre-extensible firmware interface initialization phase 204, wherein the IHS may initialize 218 a CPU, initialize 220 a chipset, and initialize 222 a motherboard. After initializing the CPU, chipset and motherboard, the IHS may initialize intrinsic services 226 and may enter a driver execution environment 206. The IHS may initiate an extensible firmware interface driver dispatcher 224 which may execute device, bus, and/or services drivers 228. The EFI driver dispatcher 224 may then initialize a boot manger 230 and the IHS may enter a boot device select (BDS) phase 208 to select a boot device. In some embodiments, a pre-boot graphical user interface may be initialized when the information handling system exits a driver execution environment stage 206 and enters a boot device select stage 208. The information handling system may then enter a transient system load (TSL) phase where the boot manger may initialize a transient OS boot loader 232, a transient OS environment 234, and an OS-absent application 236. The boot manger 230 may initialize a final OS boot loader 238 to initialize final operation of the operating system. The information handling system may then enter a run time phase 212 where a final OS environment 240 is presented, and an OS-present application 242 is executed. When the information handling system enters the run time phase 212, the pre-boot stage may end. When an information handling system is powered down, it may enter an after life stage 214 and may perform a shutdown operation 244. In some embodiments, if an information handing system is simply restarted, it may bypass a security stage 202 and proceed directly to initialization of intrinsic services 226.

Figure 3A:
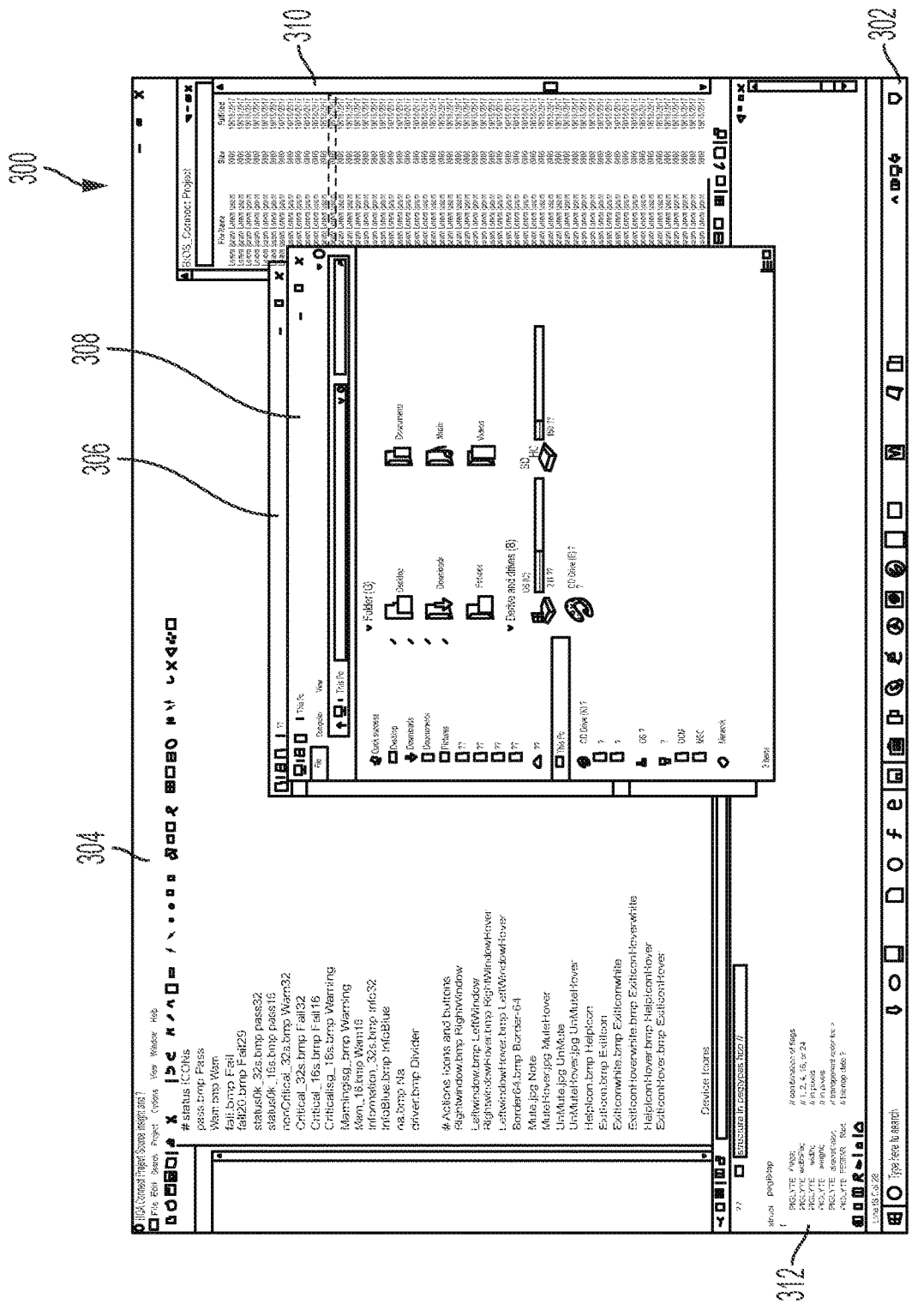
FIG. 3A is an illustration of an example user interface at a high resolution according to some embodiments of the disclosure.

Information handling systems may include displays of various sizes and native resolutions. Information handling systems may be configurable to display a graphical user interface on a display at multiple different resolutions and/or aspect ratios. When an information handling system detects a change in resolution, the information handling system may adjust its presentation of a graphical user interface to match the new resolution. For example, when transitioning from a higher resolution to a lower resolution, an information handling system may zoom in on or expand a user interface indiscriminately, without regard for information being obscured due to the change in resolution. An example user interface 300 of an OS at a high resolution, such as 1920 by 1080, is shown in FIG. 3A. The user interface may include various user interface elements and sub-elements. For example, the user interface 300 may include a task bar 302 including a plurality of icons. The user interface may also include a variety of windows 304, 306, 308, and 310, each of which may include a variety of widgets, icons, fonts, images, and other user interface elements.

Figure 3B:
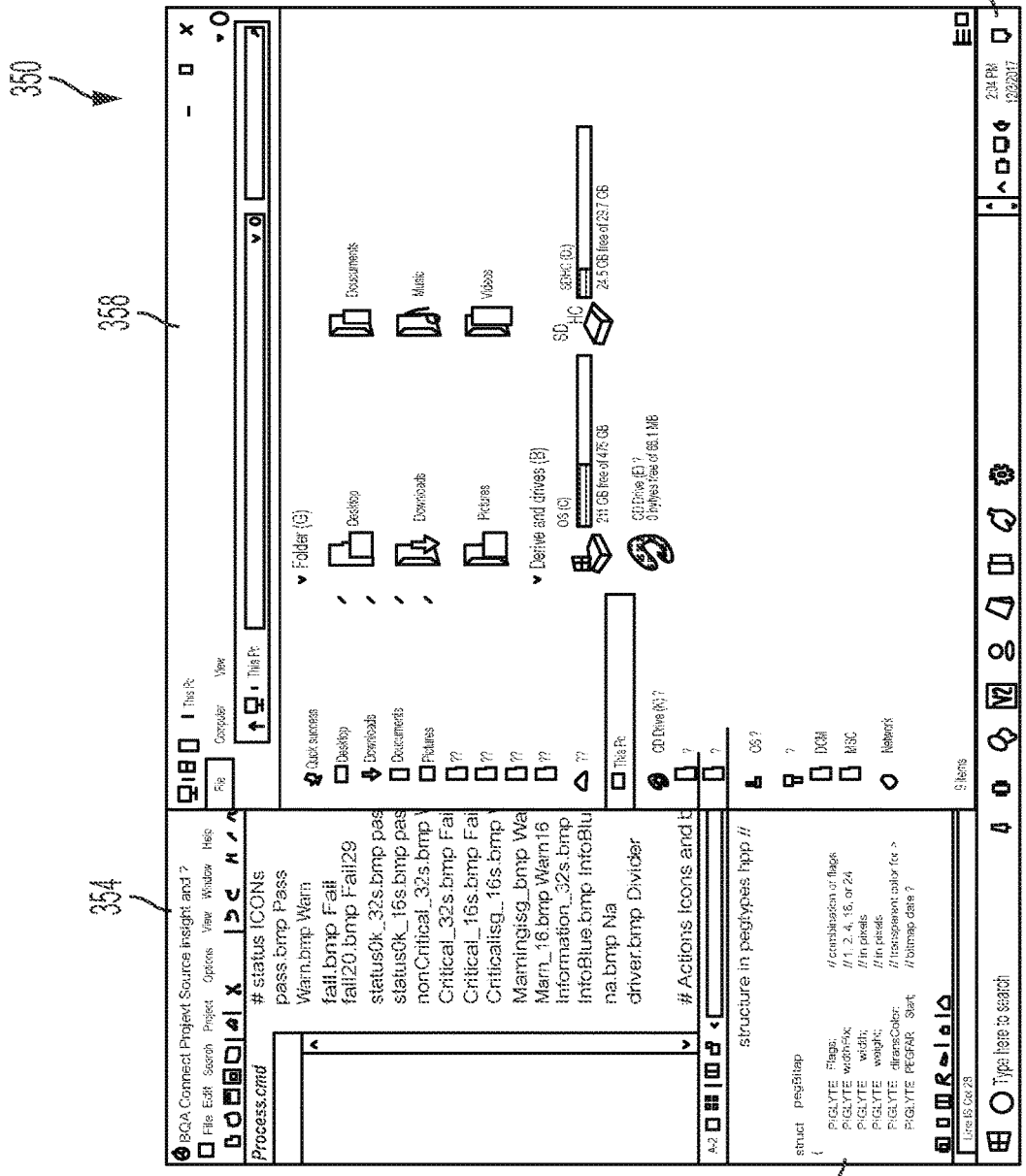
FIG. 3B is an illustration of an example user interface at a low resolution according to some embodiments of the disclosure.

If a change in resolution is detected, for example a shift from a high resolution to a low resolution, the information handling system may zoom in on the user interface and/or the windows displayed without regard for loss of information displayed on the user interface. An example user interface 350 of an OS at a low resolution, such as 1280 by 720, is shown in FIG. 3B. For example, the user interface of FIG. 3A may transition to the user interface of FIG. 3B or a user interface at a similar resolution when a user or application adjusts a resolution downward. Much of the information displayed at the high resolution, as shown in FIG. 3A, is obscured in the user interface 300 of FIG. 3B. For example, many of the icons of task bar 352 have been obscured and/or distorted during the transition. Zooming, stretching, compressing, or expanding a user interface or user interface elements may result in improper alignments of user interface elements, user interface element crossovers, missed widgets and other user interface elements, and other user interface characteristics that may obscure information that was displayed at a first resolution. Window 358 now blocks much of the information displayed by windows 354 and 362 and the window 306, shown in FIG. 3A, is completely obscured. If a user interface or window of a user interface are simply zoomed in on, stretched, compressed, and/or expanded when transitioning between resolutions, as shown in FIG. 3B, instead of intelligently mapping each user interface element based on the change in resolution, information displayed by a graphical user interface at a high resolution may be obscured.

Figure 4A:
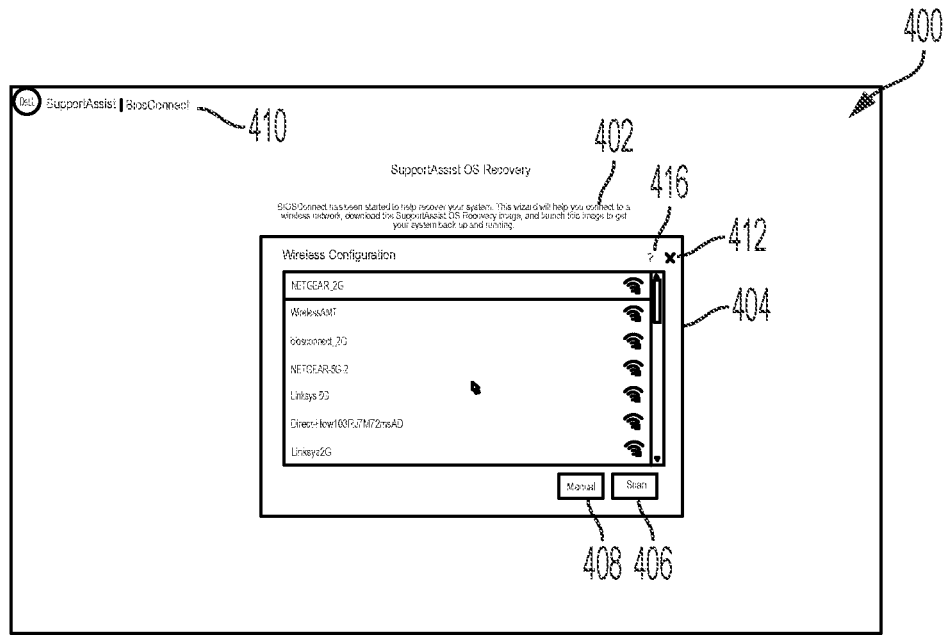
FIG. 4A is an illustration of an example pre-boot user interface at a high resolution according to some embodiments of the disclosure.

Likewise, when an information handling system is in a pre-boot stage, a BIOS/UEFI may also detect a change in resolution and may adjust display of a graphical user interface accordingly. For example, a BIOS/UEFI may store graphical user interface elements in a graphics library at a default resolution. When the BIOS/UEFI is initialized on an information handling system having a display that is different from a default resolution, it may adjust the display of the user interface by zooming in on and/or expanding a user interface. FIG. 4A shows an example user interface 400 at a high resolution, such as 1920 by 1080. The user interface 400 may include various widgets, such as manual button 408, scan button 406, help button 416, and close button 412. The user interface 400 may also include windows, such as window 404, which may include widgets, fonts, bitmaps, and other user interface elements. The user interface may also include other fonts, such as header 410 and instructive text 402.

Figure 4B:
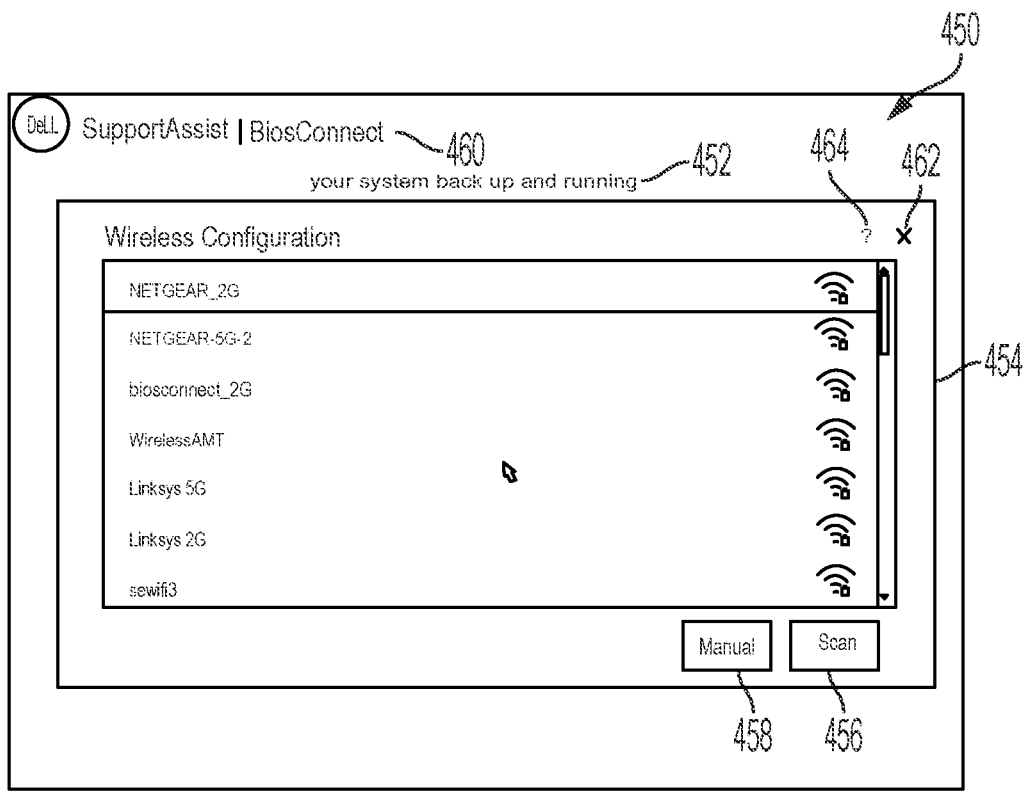
FIG. 4B is an illustration of an example pre-boot user interface at a low resolution according to some embodiments of the disclosure.

The user interface of FIG. 4A may be a default user interface at a default resolution, as created from various graphics accessed in a graphics library. When a change in resolution is detected, for example a shift from a high resolution to a low resolution, the information handling system may zoom in on the user interface 400 and/or the windows displayed by the user interface without regard for loss of information displayed on the pre-boot user interface 400. An example user interface 450 at a low resolution, such as 1280 by 720, is shown in FIG. 4B. As shown in FIG. 4B, while widgets 458, 456, 464, and 462 remain, along with header 410 and window 454, window 454 and header 460 have been zoomed in on and/or expanded to obscure most of instructive text 452. Thus, like the Operating System user interface example of FIGS. 3A and 3B, if a user interface or windows of a user interface are zoomed in on and/or expanded when transitioning between resolutions, as shown in FIG. 4B, instead of intelligently scaling each user interface element based on the change in resolutions, information displayed by a graphical user interface at a high resolution may be obscured.

Figure 5:
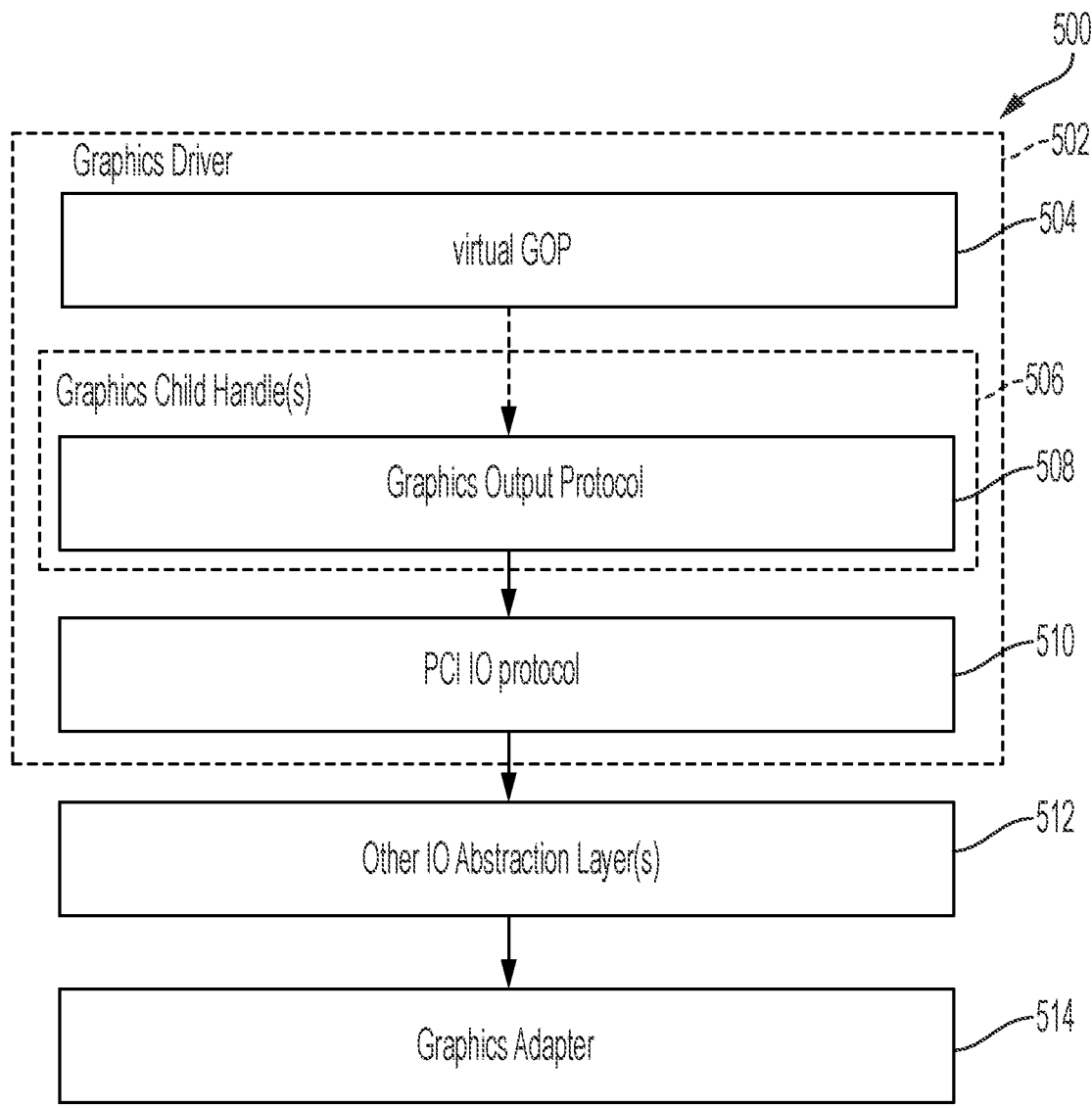
FIG. 5 is a block diagram of an example information handling system graphics stack according to some embodiments of the disclosure.

A graphics stack of an information handling system, executed in software and/or hardware, may employ virtual graphics protocols and frame buffers to scale user interface elements based on a change in resolution before processing the user interface elements with a real graphics output protocol and writing the user interface elements to a real video buffer. An example graphics stack 500 is shown in FIG. 5. The graphics stack 500 may include a graphics driver 502, such as a uniform extensible firmware interface (UEFI) graphics driver. The graphics driver 502 may include a virtual graphics output protocol (GOP) 504 to intercept graphics files requested by graphics child handle(s) 506 such as a real graphics output protocol 508. The virtual graphics output protocol 504 may be an intelligent dynamic resolution scaling (iDRS) virtual graphics output protocol and may intercept graphics files for user interface elements requested from a graphics library by a graphics output protocol 508 to perform dynamic resolution scaling when a change of resolution of a display is detected. For example, the virtual graphics output protocol 504 may detect that a display has a different resolution from a default resolution of graphics files for user interface elements requested by a graphics output protocol 508 and may dynamically scale the resolution of each of the user interface elements to the determined resolution of the display. After the virtual graphics output protocol has dynamically scaled the resolution of a user interface element requested by the real graphics output protocol 508, it may pass the element to the graphics output protocol 508. The graphics output protocol 508 may process the elements further and may write the graphical user interface to a graphics adapter 514 to display the graphical user interface with the scaled user interface elements at the new resolution. In some embodiments, user interface elements may be passed through a peripheral component interconnect (PCI) input/output (IO) protocol 510, which may be responsible for enumerating PCI devices such as graphics devices, and other IO abstraction layers 512 for further processing.

Figure 6:
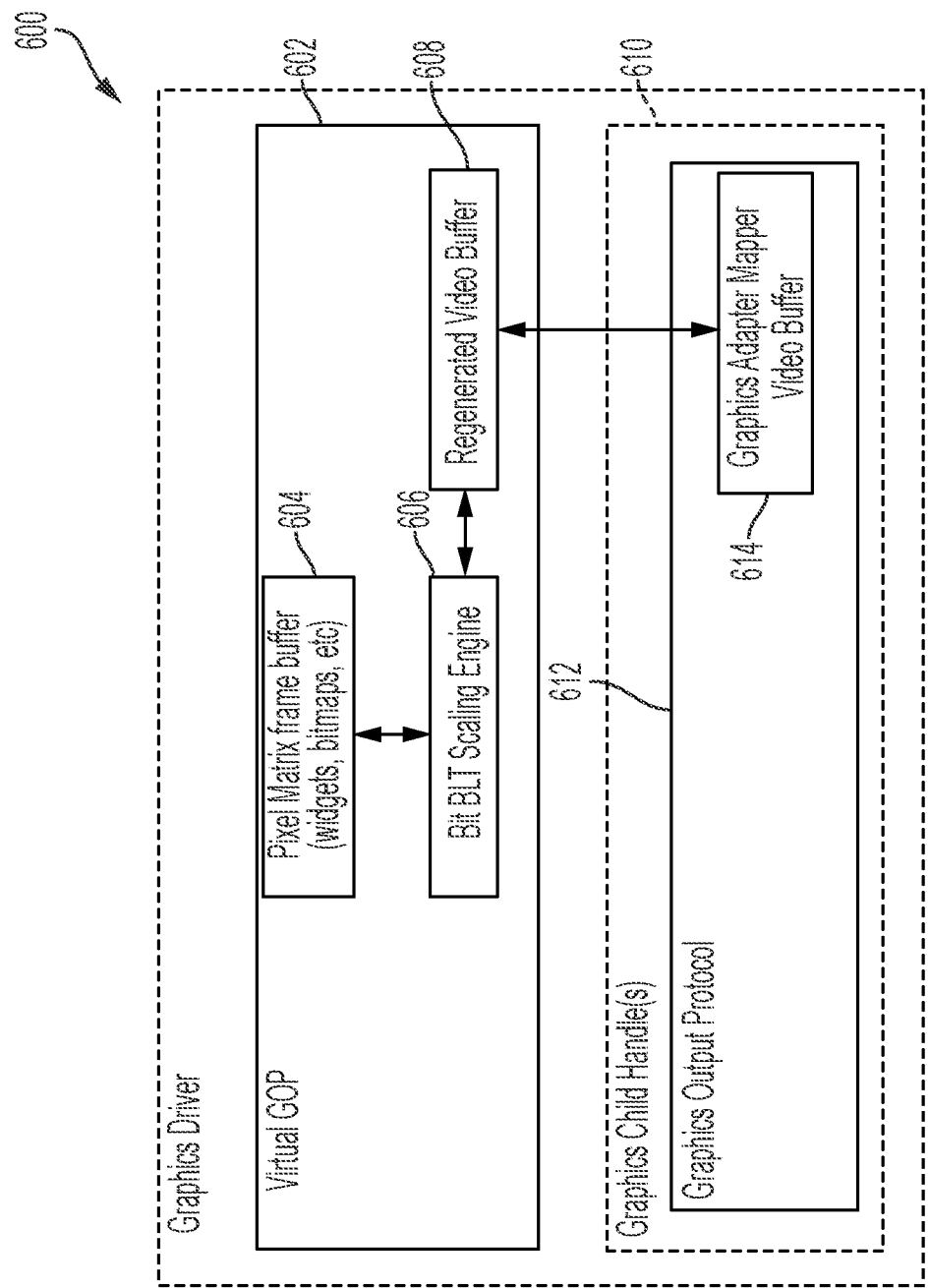
FIG. 6 is a block diagram of an example graphics driver according to some embodiments of the disclosure.

A virtual graphics output protocol may perform a bit block transfer (BLT) of user interface elements to dynamically scale the user interface elements based on a detected change in resolution. An example graphics driver 600 including a virtual graphics output protocol 602 for performing a bit BLT of user interface elements is shown in FIG. 6. The virtual GOP 602 may be an iDRS virtual graphics output protocol and may be part of a set of UEFI boot time drivers responsible for bringing up and scaling a display during a BIOS boot. The virtual GOP 602 may include a pixel matrix frame buffer 604, to which graphics files, such as pixel matrices, for user interface elements, such as widgets, bitmaps, icons, windows, fonts, and other user interface elements, may be loaded from a graphics library. Graphics files, for example, may be loaded to the pixel matrix frame buffer 604 at one or more default resolutions. The virtual GOP 602 may generate an aspect ratio pixel matrix for the user interface elements detailing an aspect ratio for each of the user interface elements loaded to the pixel matrix frame buffer. For example, the aspect ratio pixel matrix may be a pixel matrix detailing an aspect ratio for each element of the graphical user interface and relationships between the aspect ratios of various user interface elements. For example, a first user interface element may have a 2×2 aspect ratio while a second user interface element may have a 4×4 aspect ratio. The aspect ratio pixel matrix may detail both the aspect ratios of the first user interface element and the second user interface element and the relationship between the first user interface element and the second user interface element, such as the fact that the second user interface element is twice the size of the first user interface element.

The virtual GOP 602 may include a bit block transfer (BLT) scaling engine to perform a bit BLT operation on pixel matrices loaded into the frame buffer 604. For example, the bit BLT scaling engine 606 may scale each user interface element based, at least in part, on a change in resolution from a first resolution, such as a default resolution, to a second resolution. The bit BLT scaling engine 606 may, for example receive a first pixel matrix for a first user interface element at a first resolution. In some embodiments, the bit BLT scaling engine 606 may also receive an aspect ratio pixel matrix for one or more user interface elements detailing an aspect ratio of each user interface element at the first resolution. The bit BLT scaling engine 606 may then generate a second pixel matrix, such as a pixel matrix template, for the user interface element at a second resolution having the same aspect ratio as the first pixel matrix. Template pixel matrices having the same aspect ratios as first pixel matrices may be generated even when the first resolution and the second resolution have different aspect ratios. Thus, a user interface containing multiple user interface elements may be generated at a second resolution with a new aspect ratio, while user interface elements may maintain their aspect ratios through the transition from the first resolution to the second resolution.

The bit BLT scaling engine 606 may map each pixel of the first pixel matrix for the first user interface element to the second pixel matrix at the second resolution. Once the pixels of the first pixel matrix are mapped to the second pixel matrix, the bit BLT scaling engine 606 may output the second pixel matrix to a virtual regenerated video buffer 608 of the virtual graphics output protocol 602. The bit BLT scaling engine 606 may, for example, generate coordinates for each scaled object at the second resolution which may then be used to render the user interface at the second resolution. The virtual regenerated video buffer 608 may write the scaled user interface elements at the second resolution to a graphics adapter mapper video buffer 614 of the graphics output protocol 612. After the scaled user interface elements are written to the graphics adapter mapper video buffer 614, the graphics output protocol GOP 612 may further render the scaled user interface elements in the video buffer 614 to display the scaled user interface on a display. Scaling user interface elements in the virtual GOP 602 using virtual buffers before writing the scaled user interface to the graphics adapter mapper video buffer 614 may prevent flickering that may result if scaling were performed by a real GOP. The graphics output protocol 612 may be one of a plurality of graphics child handles 610. Thus, a virtual graphics output protocol 602 may perform a bit BLT scaling operation to scale user interface elements based on a change in resolution, while maintaining an aspect ratio of each of the user interface elements.

Figure 7:
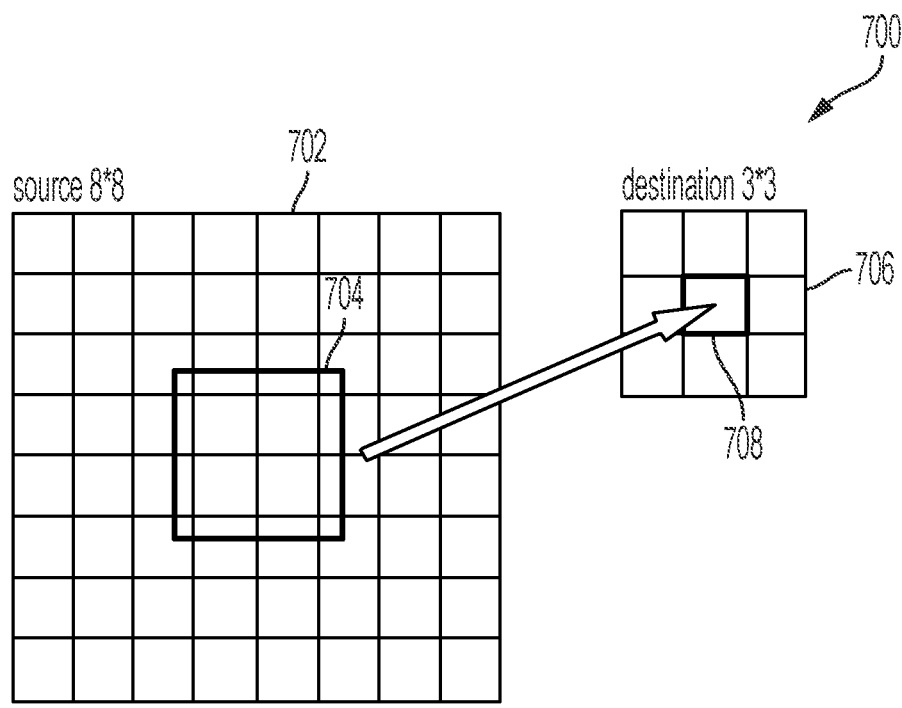
FIG. 7 is an illustration of an example bit block transfer (BLT) pixel mapping according to some embodiments of the disclosure.

A virtual graphics output protocol may perform a bit BLT on a graphical user interface element to scale the graphical user interface element from a first resolution to a second resolution. An example bit BLT operation 700 is shown in FIG. 7. A bit BLT scaling engine, such as discussed with respect to FIG. 6, may receive a first pixel matrix 702 for a first user interface element at a first resolution. For example, the first pixel matrix 702 may be an 8 by 8 source matrix. A second pixel matrix 706 for the user interface element may be generated. For example, the second pixel matrix 706 may be a 3 by 3 destination matrix. As shown in FIG. 7, the aspect ratio of the first pixel matrix 702, which is 1:1, is identical to the aspect ratio of the second pixel matrix 706. Thus, a user interface element may be scaled from a higher resolution pixel matrix 702 to a lower resolution pixel matrix 704, while maintaining an aspect ratio of the user interface element. A portion of the first matrix 702 may be mapped to each pixel of the second pixel matrix 706. For example, if the second pixel matrix 706 includes 9 pixels, one ninth of the first pixel matrix 702 will be mapped to the corresponding pixel of the second pixel matrix 706. For example, a central one ninth 704 of the first pixel matrix 702 may be mapped to a central pixel 708 of the second pixel matrix 706. Such mapping may be performed by taking an average of all pixels within the one ninth 704 of the first pixel matrix 702 or by another mapping mechanism. Each pixel of the second pixel matrix 706 may be calculated by scanning the relevant pixels of the first pixel matrix 702 left to right and top to bottom while projecting the selected pixel of the second pixel matrix 706 over the relevant portion of the first pixel matrix 702. Such a process may be repeated for each user interface element to generate a composite pixel matrix for the user interface at the second resolution.

A multiplication/division factor may be determined by dividing a width of the first pixel matrix 702, 8, by a width of the second pixel matrix 706, 3. Thus, the multiplication/division factor for first pixel matrix 702 and second pixel matrix 706 may be 2.667. A similar operation may be applied to the length of the first pixel matrix 702 and the second pixel matrix 706. In the example of FIG. 7, the first and second pixel matrices have equal lengths and widths, and thus 2.667 by 2.667 pixel areas of the first pixel matrix 702 are mapped to each pixel of the second pixel matrix. If scaling from a lower resolution to a higher resolution, a similar process may be followed where each pixel of a lower resolution pixel matrix is mapped to multiple pixels of a higher resolution matrix corresponding to the location of the pixel in the higher resolution matrix.

Figure 8:
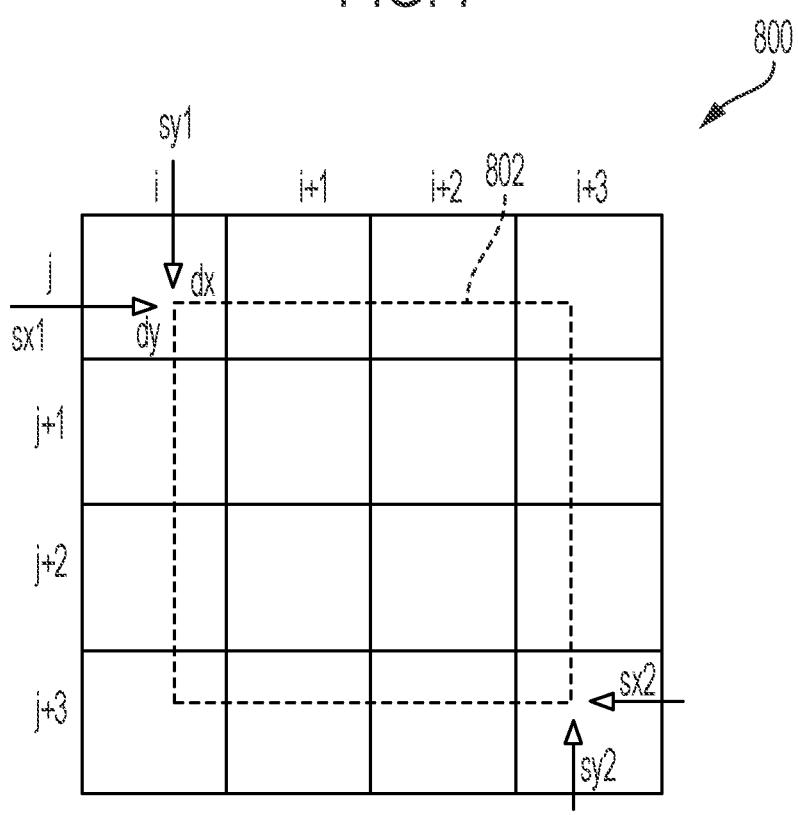
FIG. 8 is an illustration of an example of a pixel overlay of a bit block transfer (BLT) according to some embodiments of the disclosure.

An example diagram of a first pixel matrix 800 with an overlaid portion 802 of the first pixel matrix for mapping onto a pixel of a second pixel matrix is shown in FIG. 8. For example, the first pixel matrix 800 may be a zoomed in view of first pixel matrix 702 of FIG. 7. The overlaid portion 802 may be an overlay of a pixel of a second pixel matrix for mapping of multiple pixels of the first pixel matrix 800 to a pixel of the second pixel matrix. Pixels in a second pixel matrix may be addressed by x and y variables, such that each pixel of the second pixel matrix may be addressed by a specific set of x and y coordinates. Pixels in the first pixel matrix 802 may be addressed by i and j variables, such that each pixel of the first pixel matrix 802 may be addressed by a specific set of i and j coordinates. The overlaid portion 802 of a pixel of the second pixel matrix on the first pixel matrix 800 may have a length and/or width equal to a multiplication/division factor of the first and second pixel matrices, as discussed above. For example, an overlaid portion 802 may have an upper left corner at a location i=sx1, which may be equal to the multiplication/division factor multiplied by the x coordinate of the pixel of the second matrix, and j=sy1, which may be equal to the multiplication/division factor multiplied by the y coordinate of the pixel of the second matrix. The overlaid portion 802 may have a lower right corner at a location i=sx2, which may be equal to the sum of sx1 and the multiplication/division factor, and j=sy2, which may be equal to the sum of sy1 and the multiplication/division factor. If the length of the second pixel matrix differs from the width of the second pixel matrix, separate multiplication/division factors may be used for sx1 and sy1 and sx2 and sy2. X, y, i, and j may be integers while sx1, sy1, sx2, and sy2 may be floating point numbers. An area of overlap of a pixel of the second pixel matrix over a pixel of the first pixel matrix may be calculated by multiplying dx, a width of the overlap, by dy, a length of the overlap. Thus, pixels of a first pixel matrix may be mapped to pixels of a second pixel matrix to scale a graphical user interface element to a new resolution, while maintaining an aspect ratio of the graphical user interface element.

Figure 9:
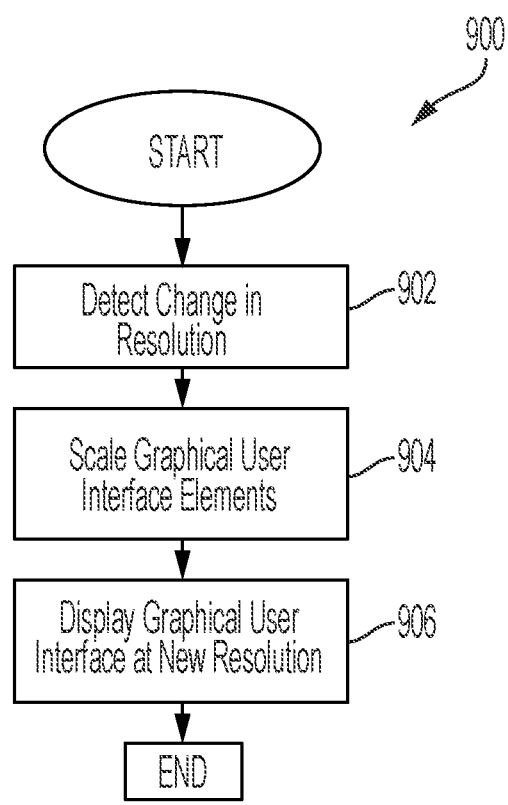
FIG. 9 is a flow chart of an example method for dynamic resolution scaling according to some embodiments of the disclosure.

An information handling system may dynamically scale one or more graphical user interface elements upon detecting a change in resolution. A method 900 for dynamically scaling user interface elements upon detecting a change in resolution is shown in FIG. 9. The method 900 may begin, at step 900, with detecting a change in resolution from a first resolution to a second resolution. For example, an operating system may detect a display with a native resolution different from a default resolution at which graphics files for elements of a graphical user interface are stored. Alternatively or additionally, the operating system may detect a change in a resolution setting for a display. A UEFI/BIOS may also detect a manual or automatic adjustment in resolution for a display of an information handling system. Alternatively or additionally, a UEFI/BIOS may detect a display of an information handling system with a native resolution that differs from a resolution at which graphics files for elements of a UEFI/BIOS pre-boot graphical user interface are stored.

At step 902, one or more graphical user interface elements may be scaled based on the detected change in resolution. The graphical user interface elements may be scaled in such a way as to scale user interface elements to the second resolution while preventing user interface elements from obscuring information that was displayed by the graphical user interface at the first resolution. For example, if a change in resolution from a lower first resolution to a higher second resolution is detected, a pixel of a pixel matrix at the first resolution for the user interface element may be mapped to a multiple pixels of a second pixel matrix at the second resolution for the user interface element. If a change in resolution from a higher resolution to a lower resolution is detected, multiple pixels of a pixel matrix at the first resolution may be mapped to a single pixel of a second pixel matrix at the second resolution for the user interface element while maintaining an aspect ratio of the pixel matrix. The first and second pixel matrices may have identical aspect ratios. The mapping process may be repeated for each user interface element displayed on a graphical user interface, until a graphical user interface at the second resolution has been generated. At step 904, the graphical user interface at the second resolution may be displayed on a display of the information handling system. Thus, graphical user interface elements may be dynamically scaled based on a change in resolution, while preventing information that was displayed at a first resolution from being obscured at a second resolution.

Figure 10:
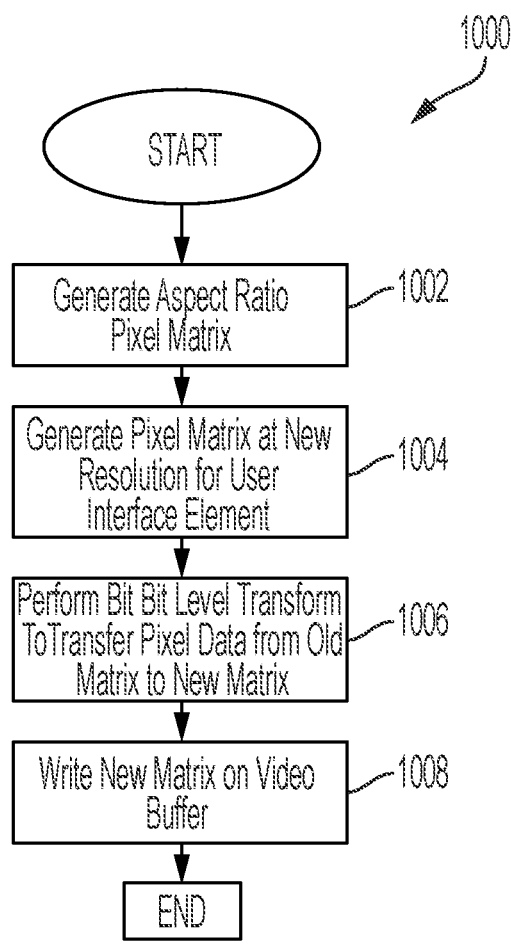
FIG. 10 is a flow chart of an example method for pixel mapping during a dynamic resolution scaling process according to some embodiments of the disclosure.

A bit block transfer (BLT) operation may be used to scale graphical user interface elements from a first resolution to a second resolution without obscuring information displayed at the first resolution. An example method 1000 for scaling graphical user interface elements is shown in FIG. 10. The method 1000 may begin, at step 1002, with generating an aspect ratio pixel matrix for the user interface. The aspect ratio pixel matrix may include an aspect ratio for each of the one or more user interface elements at the first resolution. At step 1004, a second pixel matrix for a user interface element may be generated at the second resolution based, at least in part, on the aspect ratio pixel matrix. For example, a second pixel matrix for a user interface element may be generated based on the second resolution and based on the aspect ratio of the user interface element at the first resolution included in the aspect ratio pixel matrix. The second pixel matrix may have an identical aspect ratio to the first pixel matrix.

At step 1006, a bit BLT transform may be performed on a first pixel matrix at the first resolution for the user interface element to copy pixel information from the first pixel matrix to the second pixel matrix. For example, such an operation may be performed as described with respect to FIGS. 7 and 8. If a change in resolution from a lower first resolution to a higher resolution is detected, each pixel of the first pixel matrix may be mapped to multiple pixels of the second pixel matrix. If a change in resolution from a higher resolution to a lower resolution is detected, multiple pixels of the first pixel matrix may be mapped to a single pixel of the second pixel matrix. At step 1008, the second pixel matrix, populated with information from the first pixel matrix, may be written to a video buffer for display in a graphical user interface at the second resolution.

The schematic flow chart diagrams of FIGS. 9-10 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

As used herein, when two or more elements are referred to as "coupled" to one another, such term indicates that such two or more elements are in electronic communication or mechanical communication, as applicable, whether connected indirectly or directly, with or without intervening elements.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for dynamic resolution scaling, comprising:
  detecting a change in a resolution for a display of an information handling system from a first resolution to a second resolution;
  determining an aspect ratio of each of a plurality of elements of a graphical user interface to generate a plurality of aspect ratios associated with the plurality of elements of the graphical user interface;
  generating an aspect ratio pixel matrix that indicates the plurality of aspect ratios associated with the plurality of elements of the graphical user interface;
  after determining the aspect ratio of each of the plurality of elements of the graphical user interface and the aspect ratio pixel matrix, scaling a resolution of each of the plurality of elements of the graphical user interface based, at least in part, on the second resolution and the aspect ratio pixel matrix while maintaining the aspect ratio of each of the plurality of elements of the graphical user interface; and
  displaying the graphical user interface including the scaled plurality of elements at the second resolution.

2. The method of claim 1, wherein the step of scaling comprises adjusting positioning of the plurality of elements of the graphical user interface to reduce overlap of the plurality of elements of the graphical user interface.

3. The method of claim 1, wherein the step of scaling further comprises:
  generating a pixel matrix at the second resolution for each of the plurality of elements of the graphical user interface based, at least in part, on the aspect ratio pixel matrix.

4. The method of claim 1, wherein the step of scaling comprises performing a bit block transfer (BLT) operation for each of the plurality of elements of the graphical user interface.

5. The method of claim 4, wherein performing the bit BLT operation comprises, for each of the plurality of elements of the graphical user interface, copying data for at least one pixel from a source pixel matrix at the first resolution to a destination pixel matrix at the second resolution.

6. The method of claim 1, wherein the plurality of elements of the graphical user interface comprise at least one of a font, a bitmap, a window, a widget, an image, or an icon.

7. The method of claim 1, wherein the steps of detecting, adjusting scaling, and displaying are performed while the information handling system is in a pre-boot stage.

8. The method of claim 1, wherein the plurality of elements of the graphical user interface include a first user interface element and a second user interface element, wherein the aspect ratio pixel matrix indicates a first aspect ratio of the plurality of aspect ratios that is associated with the first user interface element and further indicates a second aspect ratio of the plurality of aspect ratios that is associated with the second user interface element, and wherein the first aspect ratio is different than the second aspect ratio.

9. The method of claim 8, wherein the aspect ratio pixel matrix further indicates a relationship between the first user interface element and the second user interface element.

10. The method of claim 9, wherein the relationship includes a size of the second user interface element relative to the first user interface element.

11. The method of claim 1, wherein the information handling system executes a graphics driver that includes a first graphics output module and a second graphics output module that is distinct from the first graphics output module, and further comprising:
based on detecting the change in the resolution, intercepting one or more graphics files associated with the plurality of elements by the first graphics output module, wherein the one or more graphics files are associated with the first resolution, and wherein the scaling of the plurality of elements is performed by the first graphics output module to reduce or avoid a flickering effect associated with processing by the second graphics output module;
after performing the scaling of the plurality of elements, providing the scaled plurality of elements at the second resolution from the first graphics output module to the second graphics output module; and
writing, by the second graphics output module, the scaled plurality of elements to a graphics adaptor to enable the displaying of the scaled plurality of elements at the graphical user interface based on the second resolution.

12. The method of claim 11, wherein the first graphics output module corresponds a virtual graphics output module, and wherein the second graphics output module corresponds to a real graphics output module.

13. The method of claim 11, wherein the first graphics output module includes a pixel matrix frame buffer that receives the one or more graphics files based on the first resolution, wherein the first graphics output module further includes a bit block transfer (BLT) scaling engine that performs the scaling of the plurality of elements based on the one or more graphics files stored at the pixel matrix frame buffer, and wherein the first graphics output module further includes a virtual regenerated video buffer that renders the scaled plurality of elements to a graphics adapter mapper video buffer of the second graphics output module.

14. An information handling system comprising:
a processor; and
a display,
wherein the processor is configured to perform steps comprising:
detecting a change in a resolution for the display from a first resolution to a second resolution;
determining an aspect ratio of each of a plurality of elements of a graphical user interface to generate a plurality of aspect ratios associated with the plurality of elements of the graphical user interface;
generating an aspect ratio pixel matrix that indicates the plurality of aspect ratios associated with the plurality of elements of the graphical user interface;
after determining the aspect ratio of each of the plurality of elements of the graphical user interface and the aspect ratio pixel matrix, scaling a resolution of each of the plurality of elements of the graphical user interface based, at least in part, on the second resolution and the aspect ratio pixel matrix while maintaining the aspect ratio of each of the plurality of elements of the graphical user interface; and
displaying the graphical user interface including the scaled plurality of elements at the second resolution.

15. The information handling system of claim 14, wherein the step of scaling comprises adjusting positioning of the plurality of elements of the graphical user interface to reduce overlap of the plurality of elements of the graphical user interface.

16. The information handling system of claim 14, wherein the step of scaling comprises performing a bit block transfer (BLT) operation for each of the plurality of elements of the graphical user interface.

17. The information handling system of claim 14, wherein performing the bit BLT operation comprises, for each of the plurality of elements of the graphical user interface, copying data for at least one pixel from a source bitmap at the first resolution to a destination bitmap at the second resolution.

18. The information handling system of claim 14, wherein the plurality of elements of the graphical user interface comprise at least one of a font, a bitmap, a window, a widget, an image, or an icon.

19. A computer program product, comprising:
a non-transitory computer readable medium comprising instructions to perform steps comprising:
detecting a change in a resolution for a display of an information handling system from a first resolution to a second resolution;
determining an aspect ratio of each of a plurality of elements of a graphical user interface to generate a plurality of aspect ratios associated with the plurality of elements of the graphical user interface;
generating an aspect ratio pixel matrix that indicates the plurality of aspect ratios associated with the plurality of elements of the graphical user interface;
after determining the aspect ratio of each of the plurality of elements of the graphical user interface and the aspect ratio pixel matrix, scaling a resolution of each of the plurality of elements of the graphical user interface based, at least in part, on the second resolution and the aspect ratio pixel matrix while maintaining the aspect ratio of each of the plurality of elements of the graphical user interface; and
displaying the graphical user interface including the scaled plurality of elements at the second resolution.

20. The computer program product of claim 19, wherein the step of scaling further comprises:
generating a pixel matrix at the second resolution for each of the plurality of elements of the graphical user interface based, at least in part, on the aspect ratio pixel matrix.

* * * * *